(12) United States Patent
Dupaquis et al.

(10) Patent No.: US 7,672,990 B2
(45) Date of Patent: Mar. 2, 2010

(54) DIGITAL COMPUTATION METHOD INVOLVING EUCLIDEAN DIVISION

(75) Inventors: Vincent Dupaquis, Biver (FR); Michel Douguet, Marseilles (FR)

(73) Assignee: Atmel Corporation, San Jose, CA (US)

( * ) Notice: Subject to any disclaimer, the term of this patent is extended or adjusted under 35 U.S.C. 154(b) by 946 days.

(21) Appl. No.: 11/442,776

(22) Filed: May 30, 2006

(65) Prior Publication Data
US 2007/0244956 A1   Oct. 18, 2007

(30) Foreign Application Priority Data
Feb. 28, 2006   (FR)   ................... 06 01782

(51) Int. Cl.
*G06F 7/52* (2006.01)
(52) U.S. Cl. ...................... 708/654; 708/655
(58) Field of Classification Search .......... 708/650–656
See application file for complete search history.

(56) References Cited

U.S. PATENT DOCUMENTS

| | | | |
|---|---|---|---|
| 5,185,711 A | 2/1993 | Hattori | |
| 5,367,478 A | 11/1994 | Hattori | |
| 5,442,578 A * | 8/1995 | Hattori | ...................... 708/492 |
| 5,951,677 A | 9/1999 | Wolf et al. | |
| 6,396,926 B1 | 5/2002 | Takagi et al. | |
| 2004/0117423 A1* | 6/2004 | Shi et al. | ..................... 708/650 |
| 2004/0158597 A1 | 8/2004 | Ye et al. | |
| 2008/0063184 A1* | 3/2008 | Paillier et al. | ................ 708/491 |

OTHER PUBLICATIONS

B.D. de Dinechin, "A Ultra Fast Euclidean Division Algorithm for Prime Memory Systems", ACM, 1991 pp. 56-65.

S.M. Sedjelmaci, "The Accelerated Euclidean Algorithm", Proceedings of EACA, 2004, pp. 283-287 (3 pages).

J.C. Bajard et al., "A New Euclidean Division Algorithm for Residue Number Systems", IEEE, 1996, pp. 45-54.

H.J. Kwon et al., "A One Division per Clock Pipelined Division Architecture Based on LAPR (Lookahead of Partial-Remainder) for Low-Power ECC Applications", Proceedings of 1997 Int'l Symposium on Low Power Electronics and Design (ISPLED 1997), Monterey, CA, USA, Aug. 18-20, 1997, pp. 220-224.

D. Leijen, "Division and Modulus for Computer Scientists", University of Utrecht, Dept. of Computer Science, The Netherlands, Dec. 3, 2001, 6 pages.

(Continued)

*Primary Examiner*—Tan V Mai
(74) *Attorney, Agent, or Firm*—Schwegman, Lundberg & Woessner, P.A.

(57) ABSTRACT

A computational method for implementation in an electronic digital processing system performs integer division upon very large (multi-word) operands. An approximated reciprocal of the divisor is obtained by extracting the two most significant words of the divisor, adding one to the extracted value and dividing from a power of two out to two significant words. Multiplying this reciprocal value by a remainder (initialized as the dividend) obtains a quotient value, which is then decremented by a random value. The randomized quotient is multiplied by the actual divisor, and decremented from the remainder. The quotient value is accumulated to obtain updated quotient values. This process is repeated over a fixed number of rounds related to the relative sizes in words of the dividend and divisor. Each round corrects approximation and randomization errors from a preceding round.

14 Claims, 1 Drawing Sheet

OTHER PUBLICATIONS

V. Baladi, "Distributed Analyses of Euclidean Algorithms", Institut de Mathematiques de Jussieu, F-75251, Paris, France, Dec. 1, 2003, 15 pages.

E.W. Weisstein, "Euclidean Algorithm", website printout: http//mathworld.wolfram.com/EuclideanAlgorithm.html, 6 pages.

M. Rabin, "Number Theory and Algebra Background (Sections 1 and 2)", Harvard University, CS220r: Cryptography, Sep. 30, 2002, 6 pages.

* cited by examiner

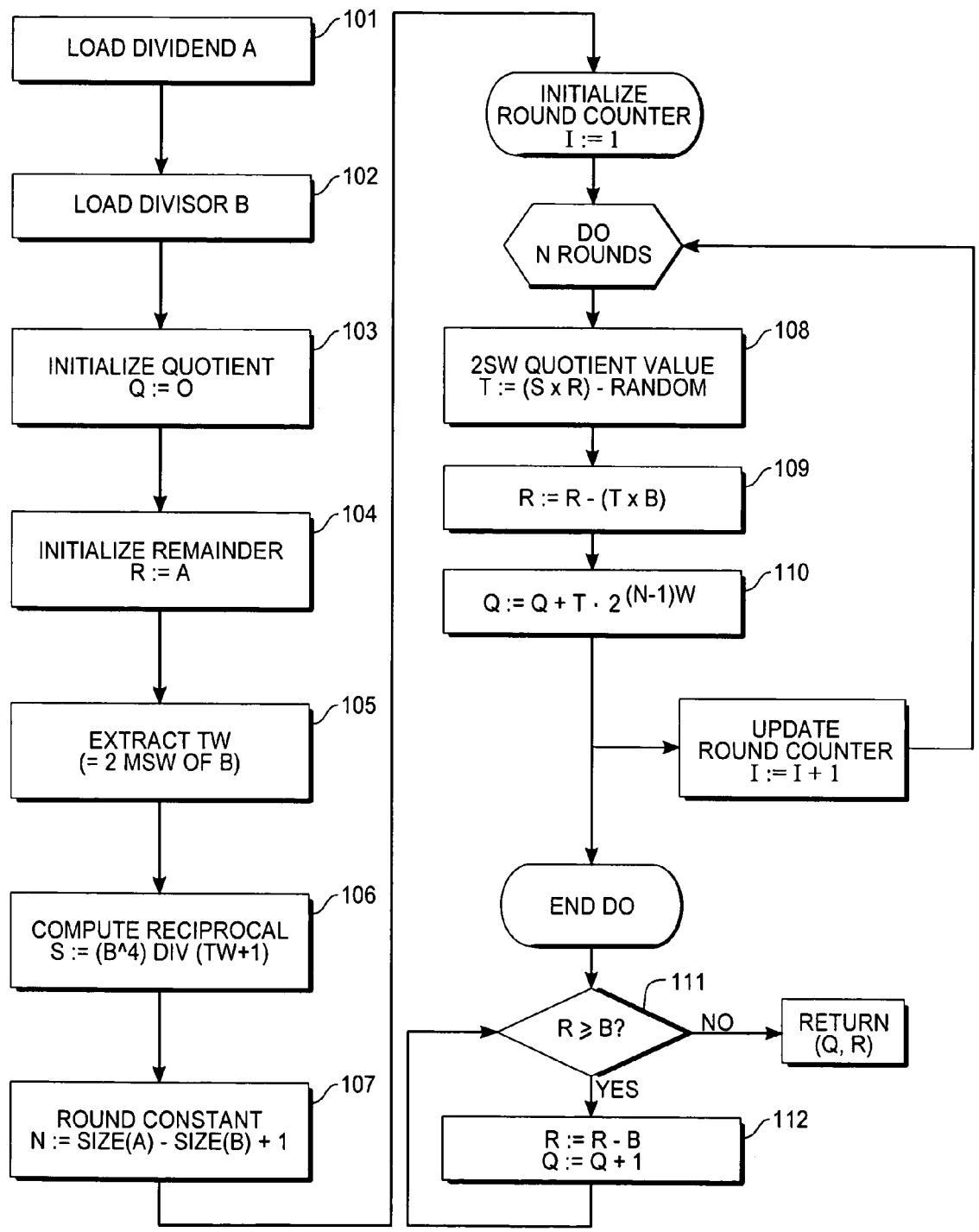
Fig._1

DIGITAL COMPUTATION METHOD INVOLVING EUCLIDEAN DIVISION

TECHNICAL FIELD

The present invention relates to arithmetic processing and calculating performed by programmable digital computers, processors, logic circuitry, and similar electronic hardware and any associated software, and in particular relates to computing or calculating methods wherein the arithmetic operation being performed by such hardware upon data expressed in binary numerical form is division, or more specifically, Euclidean division.

BACKGROUND ART

Euclidean division is a basic arithmetic operation that is founded upon a property that given any two integers a (dividend) and b≠0 (divisor), there exists another pair of integers q (quotient) and r (remainder), such that a=q·b+r, where $0 \leq r < |b|$. In computer software, q=a div b (where div is the integer division operation) and r=a mod b (where mod is the modulo or residue operation). (Note: slightly different definitions of div and mod in some computer systems and programming languages, involving rules for rounding or truncating the quotient, can affect the result when one or more negative integers are involved. But in each case, the relationship to the definitions given above is known.)

In electronic digital hardware, various methods of performing division computations are known, such as multiplication by the reciprocal $b^{-1}$ of the divisor, or repeated subtraction with the divisor or with some multiple of the divisor, in order to make use of the available multiplier or adder processing circuitry. Efficient techniques for operating upon extremely large (multi-word) integers are sought.

Euclidean division also refers to a related method described in Euclid's Elements (circa 300 BCE) for finding the greatest common divisor (GCD) of a pair of integers, which involves iteration in a series of rounds of mutual division. This method has practical application today in error correcting codes (e.g., Reed-Solomon codes) and in asymmetric block ciphers (i.e., public key cryptographic systems, such as Rivest-Shamir-Adleman type cryptosystems). In the error correcting applications, the basic Euclidean division algorithm is usually extended to operate upon polynomials with integer coefficients in some finite field. This is also the case for certain ciphers based on elliptic curve sets. See U.S. Pat. Nos. 5,185,711 and 5,367,478 to Hattori, and U.S. Pat. No. 5,951,677 to Wolf et al. for implementations of Euclidean division to error correction processing. U.S. Patent Application Publication No. 2004/0158597 A1 of Ye et al. illustrates an elliptic curve cryptosystem that implements inversion of polynomials in a finite field $K^{(n)}$ using extended Euclidean division. For those public key ciphers based on products of large primes, the Euclidean division algorithm may be applied, for example, to invert an extremely large integer modulus, as part of deriving related sets of public and private keys.

In as much as the integers or integer coefficients involved in these iterated division calculations are typically extremely large, the overall calculation time can be improved considerably if the basic division operation of each iterated round could be performed faster. Division operations that are based on first obtaining the reciprocal of the divisor become especially time consuming as the size of the divisor increases.

Hardware implementation of cryptographic algorithms (such as in RISC-based smart cards) may be susceptible to side-channel attacks, including power analysis and timing attacks. An attacker externally monitors aspects of the hardware that are accessible, such as current through chip pads or electromagnetic emissions from a chip, in order to obtain information about internal operations which may be subjected to various analysis in an effort to uncover the encryption key. Typically, secure microcontrollers for smart cards use various kinds of hardware-based countermeasures to thwart such attacks.

While some software-level countermeasures introduced into a cryptographic algorithm itself might also be considered, it is very important that may such countermeasures not adversely affect the speed or accuracy of the underlying computations. Not all of the internal operations of a cryptographic algorithm are as readily adaptable so as to incorporate software countermeasures without appreciable slowing and without jeopardizing accuracy of final result. Arithmetic operations in particular, including Euclidean division, generally require a specific result from operating upon given operands. Any changes that would obtain an erroneous final result would clearly be unwelcome.

SUMMARY DISCLOSURE

The present invention improves upon prior implementations of Euclidean division of multi-word integers in computer systems by running in a constant number of rounds, with a constant set of internal operations and no need for conditional testing of intermediate data. The invention also includes an internal randomization, for use where the division is executed as part of a cipher round, while still obtaining the same end result.

The method obtains the reciprocal of an approximation of the divisor and then multiplies by the dividend to obtain an integer approximation of the quotient. Here the divisor is overestimated using the two most significant words of the divisor plus one. Hence, the quotient is underestimated and is computed out to two significant words. The quotient is also decremented by a random value of up to one word less one bit. The resulting estimation and randomization errors occurring in the least significant word computed in a round are corrected in a subsequent round. The number of rounds may equal to the difference in size (in words) between the dividend and divisor, plus one, and one additional word of the quotient is computed in each round.

BRIEF DESCRIPTION OF THE DRAWINGS

FIG. 1 is a flow diagram illustrating an exemplary embodiment of the method for constant round integer division in accord with the present invention.

DETAILED DESCRIPTION

With reference to FIG. 1, after loading the dividend A and divisor B for the computation into hardware registers accessible by a processor core (steps 101 and 102), and initializing the quotient Q (starts at 0 and accumulates) and remainder R (starts at A and decrements) values (steps 103 and 104), the integer division method begins with an overestimation of the divisor B (step 105). In particular, we extract the two most significant words TW from the divisor B, and increment this two-word value by one. The present invention can be applied to numbers of any base b. The explanation given here takes the particular case where the base is a power of two, i.e., $b=2^W$, with W being the word size in bits. The more general case can be readily inferred from the example given. Thus, the reciprocal formula given below becomes $S=b^4$ div (TW+1) for the base b. In a digital processor, numbers represented by a non-binary base (such as a decimal base b=10) may be stored and processed in a coded digit format (such as binary coded decimal).

The reciprocal S is then generated (step 106). A 32-bit word is used here as an example. We define $S=2^{128}$ div (TW+1). Note that while TW is 64 bits long (two words), TW+1 can be 65 bits long, namely in the particular case where $TW+1=2^{64}$. In the usual case of $TW<2^{64}-1$, the reciprocal S is considered as 64 bits long (two words). Because it is already an approximation, only the top two significant words of the reciprocal need be computed. The most computationally intensive portion of the method would usually be the calculation of the reciprocal S, but is here simplified by using only two-significant-word values TW and S. The reciprocal value S is retained for subsequent use in each round of the quotient calculation. In the case of $TW=2^{64}-1$, the reciprocal $S=2^{64}$. This can be stored either as a three-word constant or as an indicator flag. Either way, computation of the partial quotient T is simpler. The partial quotient T for this specific case is equal to the top two words of the remainder.

The software or firmware executed by the digital processing system next loops through a total of N rounds, or preferably N+1 rounds, where N is calculated as the size difference in words between the dividend and divisor plus one (step 107). The rounds are numbered with the value I going from 1 to N inclusive.

Within each round, the computed reciprocal value S is multiplied (step 108) with the top three words of the remainder (equal to dividend A for the first round) so as to obtain a quotient value T, which for the first round is an approximation of the two most significant words of the quotient. An implementation of this step computes T by having a pointer, PA, pointing at the three most significant words of the numerator A in the first round, then shift one word position (towards the less significant words) per round. This is equivalent to T:=(S× R)div((2^(word size in bits))^3), which means that on a multiplication of a two-word value (the reciprocal S) by a three-word value (the 3 current top words of the numerator A), we keep just the two most significant words of the product. In this implementation, we just shift the pointer PA each round by one position to update the current top words of the numerator.

The quotient is randomized, i.e., decremented by a random value ("RANDOM") of a size that is at most one bit less than a full word. (The resulting errors will be corrected automatically in the next round.) The random value may be provided by random number generator hardware associated with the processor. This quotient value T is multiplied by the full divisor B and the result subtracted from the dividend to obtain a new remainder R (step 109). This remainder is retained for the next round. The partial quotient value T obtained in this first round is multiplied by $2^{(N-1)W}$, with W being the word size in bits (which can be accomplished by a left shift of N−1 words) and added to the quotient Q (previously initialized to zero). After the first round $Q=T*2^{(N-1)W}$.

By using an overestimated divisor (TW+1), we ensure that the quotient is underestimated and avoid obtaining a negative remainder. Hence, underflow conditions are not generated, and we do not have to perform testing of the remainder and conditional correction of the computed quotient and remainder. In particular, since the computed remainder is ensured to be always positive, we do not need to test the carry bit to see whether the remainder is positive or negative. We do not need to conditionally subtract one from the computed quotient and conditionally add one divisor value to the remainder in the event the remainder is found upon testing to be negative, since this condition will not occur.

The remainder R obtained during the first round (no longer equal to the dividend) is used in the second round when multiplying by the reciprocal S of the overestimated divisor (round 2, step 108). Again a quotient value T with two significant words is obtained. This second quotient value is multiplied with the full divisor, and the results subtracted from the first-round remainder to obtain a second-round remainder (round 2, step 109). The second-round remainder is retained for use in the third round, replacing the first-round remainder. The partial quotient value T obtained in this second round is multiplied by $2^{(N-2)W}$, with W being the word size in bits, (which can be done by a left shift of N−2 words) and added to the quotient value Q from the first round to obtain an accumulated quotient value Q (round 2, step 110), which is another underestimation, but now with three significant words.

Each round uses the reciprocal S, together with the remainder R from the previous round as implemented for example in the manner described above, wherein the pointer PA shifts one word position per round. Equivalently, multiplying the two (step 108) obtains a quotient value T for that round with two significant words. Multiplying this quotient value with the full divisor B and subtracting the result from the remainder R (step 109) obtains a new remainder R for use in the next round. Multiplying the partial quotient value T obtained in this round by $2^{(N-I)W}$ and then adding the result to the accumulated quotient Q (step 110) produces a new accumulated quotient Q with an additional significant word. This calculation is made with W being the word size in bits and I being the round index. The multiplication can be performed by a left shift of N−I words. If N−I=0 (the Nth round), no shift is done. When one supplemental round is added, N−I=−1 and a shift right by one word is done.

When implementing each round of division (multiplication by a reciprocal step 108), we obtain a quotient value T with two words of significance. The more significant word corrects underestimation errors in the accumulated quotient Q from the previous round, while the less significant word of the quotient value T from the current round provides a new underestimation. It is also possible to select any number of quotient words to be estimated in any round (not shown in FIG. 1). For example, instead of obtaining a two-significant-word reciprocal from the overestimated top two significant words of the divisor (steps 105 and 106), and using this reciprocal to obtain a two-significant-word quotient value in each round (step 108), we could use some larger number of words in these calculations. Hence, for example, the top three significant words of the divisor, plus one for producing an overestimation, could be used to obtain a three-significant-word reciprocal and thence three-significant-word quotient values. The accumulated quotient would gain two words of significance during each round, with the upper significant word of the round's quotient value being used to correct underestimation errors from the previous round in the accumulated quotient. However, while the total number of rounds would be reduced by half, extra computations would be needed in each round to compute the extra word of significance in the quotient value.

Especially in cases where this division operation is part of a cryptographic system, the internal operations can be randomized without affecting the final result, by introducing a random decrementing of the quotient value (step 108). Errors introduced in each round by this randomization will be automatically corrected in the subsequent round, provided the random value injected in the quotient is lower than the max value of one word minus one bit. (The injected error will be present in the next stage's quotient top word, along with the one generated by the use of a reciprocal for its computation). It is important to notice that, in that case, it is not possible to inject a random value into a quotient and make it negative, else we would get negative remainders and, depending on the embedding hardware, and hence this may not be an advantage.

It is possible, because of the quotient underestimation, that after the last round of the computational loop, the remainder from that last round will still be slightly larger than the divisor (step 111). The number of rounds of division (multiplication by a reciprocal) can be extended by one for (n+1) rounds. This added round reduces considerably the number of final subtractions needed to just one subtraction. It also computes a first fractional words of the quotient. Alternatively, a supplemental set (step 112) of conditional subtractions of the full divisor from the remainder, together with incrementing of the accumulated quotient, can handle this situation. An additional round is preferred over many conditional subtractions, but either approach can be used. Whenever the number of rounds is extended by one to reduce the number of final subtractions, randomization is not performed on the final round, so as to avoid injecting an error into the final quotient value that would not be corrected.

The method can be carried out by software or firmware executed in a hardware processor containing the necessary multiply and accumulate hardware and sufficient registers or memory access to store the divisor, its approximated reciprocal, quotient value, remainder, and accumulated quotient. Alternatively, it is well within the level of skill of hardware system designers to implement the method entirely in hardware.

What is claimed is:

1. A method implemented in an electronic digital processing system for performing an integer division computation upon large multi-word operands, the method comprising:
   (a) loading dividend and divisor operands into storage locations accessible to the processing system;
   (b) initializing a quotient and a remainder;
   (c) extracting a specified number of most significant words of said divisor, incrementing the extracted value, and computing a reciprocal thereof with said specified number of significant words;
   (d) executing by said processing system of a number of rounds, each round including:
      (i) multiplying said remainder and reciprocal to obtain a quotient value for that round with said specified number of significant words;
      (ii) decrementing the quotient value by a random value of a size not more than one bit less than one word;
      (iii) multiplying the quotient for that round by the divisor and subtracting a resulting product from the remainder to update the remainder; and
      (iv) left shifting the partial quotient by a number of words for that round and adding to the quotient to accumulate the quotient; and
   (e) if the remainder after the last round is still larger than the divisor, then subtracting the divisor from the remainder and incrementing the quotient until the remainder is less than the divisor, thereby obtaining the quotient and remainder for the loaded dividend and divisor.

2. The method of claim 1, wherein the number of rounds in step (d) is equal to a difference in words of sizes of said dividend and divisor, plus one.

3. The method of claim 1, wherein the number of rounds in step (d) is followed by one supplemental round which is the same as step (d) except that the random decrementing of substep (ii) is not implemented, and except that in substep (iv) the partial quotient is right shifted by one word then added to the quotient to accumulate the quotient.

4. The method of claim 1, wherein the specified number is two for the number of most significant words of the divisor, the number of significant words of the reciprocal and the number of significant words of the quotient for any given round.

5. The method of claim 1, wherein the reciprocal of the divisor is obtained by dividing the extracted words of the divisor plus one from a power of two greater than a total number of bits in the divisor.

6. The method of claim 1, wherein multiplying said remainder and reciprocal in substep (i) includes accessing a pointer to three significant words of the remainder, beginning in a first round with three most significant words and shifting one word position toward less significant words per round, and wherein only two most significant words of a product of the remainder and reciprocal are retained for updating the quotient value for that round.

7. The method of claim 1, wherein the processing system includes a hardware multiplier and accumulator executing programmed instructions.

8. A method implemented in an electronic digital processing system for performing an integer division computation upon large multi-word operands, the method comprising:
   (a) loading a dividend operand A and a divisor operand B into storage locations accessible to the processing system;
   (b) initializing a quotient Q as zero and a remainder R as equal to said dividend B;
   (c) extracting two most significant words TW of said divisor, incrementing the extracted value TW by one, and computing a reciprocal $S=b^4$ div (TW+1);
   (d) executing by said processing system of a number N of rounds, each round including:
      (i) multiplying the remainder R with the reciprocal S of the divisor to obtain a quotient value for that round, $T=S \times R$, with two significant words;
      (ii) decrementing the quotient value for that round by a random value, such that $T=(S \times R)-RANDOM$, where the size of the random value is not more than one word less one bit;
      (iii) multiplying the quotient value T for that round by the divisor B and subtracting a resulting product from the remainder R to update the remainder, that is, such that $R:=R-(T \times B)$; and
      (iv) left shifting the partial quotient T for that round by a number of words (N−I) and adding to the quotient Q to accumulate the quotient, that is, such that $Q:=Q+T \cdot 2^{(N-I)W}$, where I is an index for that round and W is a word size in bits; and
   (e) if the remainder R after the last round is still larger than the divisor B, then subtracting the divisor from the remainder, $R:=R-B$, and incrementing the quotient by one, $Q:=Q+1$, until the remainder is less than the divisor, thereby obtaining the quotient Q and remainder R for the loaded dividend A and divisor B, where $A=(B \times Q)+R$, and $0 \leq R < B$.

9. The method of claim 8, wherein the number of rounds N is equal to a difference in words of sizes of said dividend and divisor, plus one.

10. The method of claim 8, wherein the N rounds of step (d) is followed by one supplemental round which is the same as step (d) except that the random decrementing of substep (ii) is not implemented, and except that in substep (iv) the partial quotient T is right shifted by one word then added to quotient Q to accumulate the quotient.

11. The method of claim 8, wherein multiplying said remainder and reciprocal in substep (i) includes accessing a pointer to three significant words of the remainder, beginning in a first round with three most significant words and shifting one word position toward less significant words per round, and wherein only two most significant words of a product of the remainder and reciprocal are retained for updating the quotient value for that round.

12. A processor-readable medium storing a program executable by an electronic digital processing system, the program stored on said medium causing the electronic digital processing system to:
   (a) load a dividend operand A and a divisor operand B into storage locations accessible to the processing system;
   (b) initialize a quotient Q as zero and a remainder R as equal to said dividend B;
   (c) extract two most significant words TW of said divisor, increment the extracted value TW by one, and compute a reciprocal $S=b^4$ div (TW+1);
   (d) execute by said processing system of a number N of rounds, wherein each round
       (i) multiply the remainder R with the reciprocal S of the divisor to obtain a quotient value for that round, $T=S \times R$, with two significant words;
       (ii) decrementing the quotient value for that round by random value, such that $T=(S \times R)-RANDOM$, where the size of the random value is not more than one word less one bit;
       (iii) multiply the quotient value T for that round by the divisor B and subtracts a resulting product from the remainder R to update the remainder, that is, such that $R:=R-(T \times B)$; and
       (iv) left shift the partial quotient T for that round by a number of words (N−I) and adding to the quotient Q to accumulate the quotient, that is, such that $Q:=Q+T \cdot 2^{(N-I)W}$, where I is an index for that round and W is an word size in bits; and
   (e) if the remainder R after the last round is still larger than the divisor B, then subtract the divisor from the remainder, $R:=R-B$, and increment the quotient by one, $Q:=Q+1$, until the remainder is less than the divisor, thereby obtaining the quotient Q and remainder R for the loaded dividend A and divisor B, where $A=(B \times Q)+R$, and $0 \leq R < B$.

13. The processor-readable medium of claim 12, wherein the number N of rounds performed by the processing system is equal to a difference in words of sizes of said dividend and divisor, plus one.

14. The processor-readable medium of claim 12, wherein the number N of rounds performed by the processing system is supplemented by one additional round which is identical to processing system execution in (d) except that the random decrementing in substep (ii) is not implemented, and except that in substep (iv) the partial quotient T is right shifted by one word then added to quotient Q is accumulate the quotients.

* * * * *